(12) United States Patent
Klingberg (10) Patent No.: US 7,186,116 B2
(45) Date of Patent: Mar. 6, 2007

(54) SYSTEM AND METHOD FOR IMPROVING MEMORY CAPACITY OF A USER

(75) Inventor: Torkel Klingberg, Bromma (SE)

(73) Assignee: Cognitive Medical Systems AB, Stockholm (SE)

( * ) Notice: Subject to any disclaimer, the term of this patent is extended or adjusted under 35 U.S.C. 154(b) by 517 days.

(21) Appl. No.: 10/472,403

(22) PCT Filed: Aug. 22, 2001

(86) PCT No.: PCT/SE01/01787

§ 371 (c)(1),
(2), (4) Date: Sep. 17, 2003

(87) PCT Pub. No.: WO02/091936

PCT Pub. Date: Nov. 21, 2002

(65) Prior Publication Data

US 2004/0081944 A1    Apr. 29, 2004
US 2005/0244797 A9    Nov. 3, 2005

(30) Foreign Application Priority Data

May 14, 2001    (SE)    ........................... 0101683

(51) Int. Cl.
    G09B 19/00     (2006.01)
(52) U.S. Cl. ................. 434/236; 434/322; 434/362
(58) Field of Classification Search ............... 434/116, 434/118, 156, 167, 236–238, 247, 258, 307 R, 434/308, 322, 323, 350, 362, 365; 463/9; 600/300, 301, 544
See application file for complete search history.

(56) References Cited

U.S. PATENT DOCUMENTS

| | | | | |
|---|---|---|---|---|
| 4,683,891 A * | 8/1987 | Cornellier et al. | ........... | 600/301 |
| 5,230,629 A * | 7/1993 | Buschke | ..................... | 434/236 |
| 5,411,271 A * | 5/1995 | Mirando | ........................ | 463/9 |
| 5,437,553 A * | 8/1995 | Collins et al. | .............. | 434/322 |
| 5,618,182 A * | 4/1997 | Thomas | ..................... | 434/323 |
| 5,724,987 A * | 3/1998 | Gevins et al. | .............. | 600/544 |
| 5,911,581 A * | 6/1999 | Reynolds et al. | ........... | 434/236 |
| 5,913,310 A | 6/1999 | Brown | | |
| 6,022,221 A * | 2/2000 | Boon | ........................ | 434/156 |
| 6,053,739 A | 4/2000 | Stewart et al. | | |
| 6,186,794 B1 * | 2/2001 | Brown et al. | ............... | 434/116 |
| 6,206,702 B1 | 3/2001 | Hayden et al. | | |
| 6,231,344 B1 * | 5/2001 | Merzenich et al. | ......... | 434/236 |
| 6,261,101 B1 * | 7/2001 | Benitz et al. | ............... | 434/167 |

(Continued)

*Primary Examiner*—Joe H. Cheng
(74) *Attorney, Agent, or Firm*—Rolf Fasth; Fasth Law Offices (57) ABSTRACT

The computer training system is for training working memory capacity of a user of a computer within the system. A computer program is used within the system. A first task of a first difficulty level is presented to the user. A delay of a predetermined time is performed, during which delay the task is not visible or audible to the user. During the delay it is not possible to enter an answer into the computer. The difficulty level of a subsequent task to be presented to the user is changed in accordance with predetermined adaptation rules and the evaluation such that the difficulty level of the subsequent task approaches the memory capacity of the user. Subsequent tasks are presented to the user until a predetermined time limit is exceeded or until a predetermined number of tasks have been performed.

29 Claims, 5 Drawing Sheets

U.S. PATENT DOCUMENTS

| | | | |
|---|---|---|---|
| 6,280,198 B1 * | 8/2001 | Calhoun et al. | 434/236 |
| 6,419,496 B1 * | 7/2002 | Vaughan, Jr. | 434/322 |
| 6,629,846 B2 * | 10/2003 | Poreh | 434/236 |
| 6,632,174 B1 * | 10/2003 | Breznitz | 600/300 |
| 6,749,432 B2 * | 6/2004 | French et al. | 434/247 |

* cited by examiner

SYSTEM AND METHOD FOR IMPROVING MEMORY CAPACITY OF A USER

FIELD OF INVENTION

The present invention relates to a computer training system for training working memory capacity of a user of a computer within the system and a computer program to be used within the system.

DESCRIPTION OF RELATED ART

Working memory capacity is the ability to retain and manipulate information. This ability underlies complex reasoning. Persons with Attention deficit hyperactivity disorder (ADHD) and persons with traumatic brain injury represent groups of human beings with working memory deficits, attributed to impairments of the frontal lobe, including abnormal dopamine transmission affecting the basal ganglia and frontal cortex, or impaired connections between the basal ganglia and the frontal cortex.

ADHD is a disorder that begin in childhood and sometimes last into adult life. In general, children and adults with ADHD have difficulties paying attention and concentrating (inattention), sitting still (hyperactivity) and controlling impulsive behaviour (impulsivity). These problems can affect nearly every aspect of life. Children and adults with ADHD often struggle with low self-esteem, troubled personal relationships and poor performance in school or at work.

The ability to retain and manipulate information in working memory depends on the prefrontal cortex. Working memory underlies several cognitive abilities, including logical reasoning and problem solving. Working memory capacity has been regarded as a permanent trait of the individual, closely related to g, a proposed measure of general cognitive ability. This is e.g. referred to in Kyllonen, P. C. & Christal, R. E. *Reasoning ability is (little more than) working-memory capacity?! Intelligence* 14, 389–433 (1990). Referring to Ericsson, K. A., Chase, W. G. & Faloon, S. *Acquisition of a memory skill. Science* 208, 1181–1182 (1980), there are case studies of subjects who learned a strategies to retain a large number of digits, such strategies were not useful for remembering other types of stimuli. Therefore such training does not increase general working memory capacity.

Experts estimate that between 3% to 5% of children are affected by ADHD. Just what constitutes the best treatment for ADHD is a matter of debate. Currently, psycho stimulant drugs such as methylphenidate (Ritalin, Concerta) or dextroamphetamine (Dexedtine) are the most common treatment. The stimulant drugs are targeted at a portion of the brain called the basal ganglia (putamen, nucleus caudatus, claustrum, globus pallidus, substantia nigra and nucleus subthalamicus). So-called striato-frontal loops are associated with the basal ganglia. Those striato-frontal loops have an anomalous and not working interaction with the basal ganglia in the case of ADHD. By targeting the medicaments at the basal ganglia, the disturbance of the striato-frontal loops will be less.

However, the use of these drugs is under scrutiny. The most common side effects of psycho stimulants include loss of appetite, nervousness and problems sleeping. Parents are also understandably concerned about long-term effects of psycho stimulants, which are similar to amphetamines, and the risk of addiction.

Additionally, some doctors question giving stimulants to young children because the nervous systems of the child are under development and therefore vulnerable. Some clinicians have expressed concern about giving stimulants to children with ADHD because the long-term effect of treatment is insufficiently known. The effect of the drug is short lasting, so that the child has to medicate 2–3 times per day.

The medicaments are also expensive to produce and require a physical transport system for the patients.

Several regimens, methods and apparatus on the market today are constructed for attempting to alleviate the children's symptoms, but no regimen is constructed in such way that it will provide an alleviation of the symptoms of ADHD or hyperactivity, neither is any regimen constructed for training working memory capacity of a human being.

A computerised method and computer system for the remediation of exaggerated responses of an individual is shown in WO 99/49822. The system includes a computer, which is adopted to signal a feedback received from a patient due to a stimulus via an input device and depending on this feedback, the frequency of the stimuli is changed.

Methods for training of the audible perception are also known.

SUMMARY OF THE INVENTION

The purpose of the present invention is to provide a computer training system for improving the working memory capacity of a human being.

This is achieved by a computer training system having the features of claim 1, a computer program product directly loadable into the internal memory of the computer within the computer training system, having the features of claim 18, and a computer program product stored on a computer usable medium causing the computer within the computer training system to control execution steps, having the features of claim 35

Thanks to that the computer training system comprises means for presenting a first task of a first difficulty level, on presentation means; and means for making a delay of a predetermined time, during which delay the task is not visible or audible to the user and during which delay it is not possible to enter an answer into the computer (110); means for changing the difficulty level of a subsequent task to be presented to the user, in accordance with predetermined adaptation rules and based on said evaluation, such that the difficulty level of the subsequent task is adapted to the capacity of the user, making the user motivated to proceed with the subsequent task; and means for presenting subsequent tasks adapted to the capacity of the user as mentioned above, until a predetermined time limit is exceeded or until a predetermined number of tasks has been performed, a user of the computer within the system can perform training and improve his/her working memory capacity.

Thanks to that the computer program product directly loadable into the internal memory of a computer within the computer training system, comprises the software code means for performing the steps of: presenting a first task of a first difficulty level to the user on presentation means; making a delay of a predetermined time, during which delay the task is not visible or audible, and during which delay it is not possible to enter an answer into the computer, changing the difficulty level of a subsequent task to be presented to the user, in accordance with predetermined adaptation rules and based on said evaluation, such that the difficulty level of the subsequent task is adapted to the capacity of the user; and presenting subsequent tasks adapted to the capacity of the user in accordance with the steps above until a predetermined time limit is exceeded or until a predetermined number of tasks has been performed, a user of the computer program within the system can perform training and improve his/her working memory capacity.

A computer program product stored on a computer usable medium, comprising readable program for causing a computer within the computer training system to control an execution of the steps of: presenting a first task of a first difficulty level to the user on presentation means; making a delay of a predetermined time, during which delay the task is not visible or audible, and during which delay it is not possible to enter an answer into the computer, changing the difficulty level of a subsequent task to be presented to the user, in accordance with predetermined adaptation rules and based on said evaluation, such that the difficulty level of the subsequent task is adapted to the capacity of the user; and presenting subsequent tasks adapted to the capacity of the user in accordance with the steps above until a predetermined time limit is exceeded or until a predetermined number of tasks has been performed, a user of the computer program within the system can perform training and improve his/her working memory capacity.

An advantage of the present invention is that working memory can be enhanced. The effects of this includes reduction of symptoms, both inattention and hyperactivity, in ADHD without the use of short-acting psycho-stimulants. One advantage of not using psycho-stimulants is that possible negative effects on the brain, such as increasing the risk for future drug abuse, can be avoided.

Another advantage of the present invention is that the enhancement of working memory by the present invention is long last (several months) whereas the effect of psycho-stimulants only lasts 6 hours.

DETAILED DESCRIPTION

Figure 1:
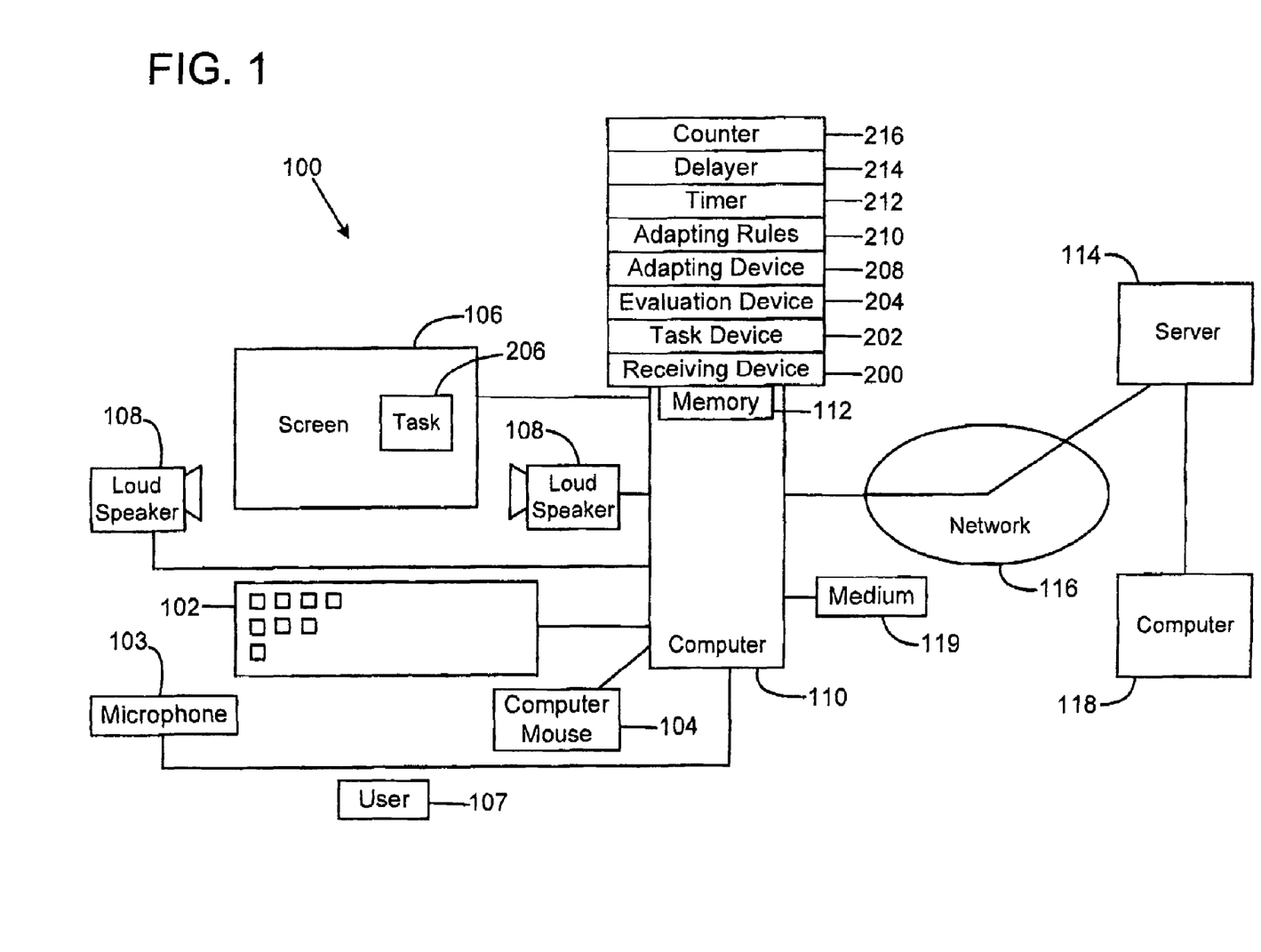
FIG. 1 shows an exemplary computer training system according to the present invention.

FIG. 1 is a block diagram of an exemplary computer training system 100 according to the present invention. The system 100 comprises a computer 110 which may be a personal computer (PC), a workstation computer or some other type of computer, to be used by a human being, from now on called the user, who intends to train and improve his/her working memory capacity. The user is e.g. a person with working memory deficit such as a child with ADHD, a person who has a traumatic brain damage such as after a stroke or any person that wishes to improve his/her working memory capacity. Further the user may be an elderly having a working memory with impaired capacity or any person that wishes to improve the capacity of working memory.

The computer 110 could be situated in the user's home, at the user's school, at the user's work, etc.

The computer 110 has a receiving device 200 for receiving, via input devices, such as keypad 102 and computer mouse 104, a user answer to a presented task generated by a task device 202 of the computer 110. The computer has an evaluation device 204 for evaluating whether the user answer is correct or not. The computer 110 is operatively connected to a presentation device, such as a screen 106, for presenting to a user 107 via the presentation device a first task 206 of a first difficulty level. The computer has an adapting device 208 for adapting the difficulty level of a subsequent task, generated by the task device 202, to be presented in accordance with predetermined adaptation rules 210 arid the evaluation of the evaluation device 204. The adapting of the difficulty level is done so that the difficulty level of the subsequent task approaches the capacity of the user. The presentation device 106 presents subsequent tasks until at least one of a predetermined time limit of a timer 212 is exceeded and a predetermined number of tasks, as counted by a counter 216, have been performed. The computer has a delayer 214 for providing a delay of a predetermined period of time. The computer training, during the deiay time, ignores user answers and removing at least one of visual and audible stimuli associated with presented subsequent tasks.

The computer 110 is adapted to comprise a computer program for training the working memory of the user. The program is adapted to run on the computer 110. This computer program is stored in a computer readable medium 119, e.g. in a memory 112 of the computer, on a CDROM insertable into a CDROM reading entity of the computer 110, on a Digital Video Disk (DVD) insertable in a DVD reading entity of the computer 110 or a floppy disc insertable in a floppy disk reader of the computer. How the computer program works is described more in detail below.

The computer 110 is connectable to input means adapted for input of data into the computer 110 such as answers to tasks, information, etc. by the user in accordance with the working memory training computer program. The input means may be e.g. a keypad 102, a pointing device such as a computer mouse 104, a microphone 103, etc. The computer 110 is further connectable to visual and/or audio presentation means adapted for presenting tasks for that user according to the working memory training computer program. The visual presentation means may be a screen 106 where tasks, information, etc. is adapted to be presented to the user so that he/she can reed or see tasks. The screen 106 is further adapted to making visible, answers to the tasks, information, etc. inserted by the user by means of the mouse 104 interacting with a cursor displayed on the screen 106 or by means of the key pad 102. The audio presentation means may be e.g. a loud speaker 108 or a head set, which according to the computer program is adapted for presentation of instructions, tasks etc. for the user.

The computer 110 may be connectable to a server 114, e.g. via the Internet 116. In that case the computer 110 comprises an Internet interface. The server 114 is adapted e.g. for storing results of training tasks and for storing the working memory training computer program. The user may connect to the server for downloading the working memory training computer program. The computer 110 may also be accessible by a second computer 118 used by e.g. training adviser and/or a medical adviser or o that the user can communicate with the adviser and further, the adviser may gets access to the test results of the user. Thus the present invention is performed by means of a traditional computer and the results of the training exercises can be analysed.

The user prepares the computer 110 that he/she is going to use for the training with the required working memory training computer program according to the present invention. This may e.g. be performed by connecting the computer to the server 114 via the Internet 116 and download the computer program, or insert a CDROM or floppy disk comprising the computer program into a CDROM or floppy disk reading entity of the computer 110. The computer training may also be web-based, in that case the user connects the computer 110 to a network such as e.g. the Internet, and performs the training on-line by means of a media player such as e.g. Shockwave™. The computer program may appear to be a video game to motivate e.g. children with ADHD to perform the training.

The training is performed by the user answering a number of presented tasks in accordance with the computer program according to the present invention. The steps of this working memory training computer program will now be described more in detail. A task of a first level is presented to the user on the screen 106 or by a voice telling the task by means of the loud speaker. The computer program will perform a delay of preferably 0.1–10 seconds after the presentation of said task. During this delay, the presentation of the stimuli to be remembered is taken away from the presentation means, i.e. the stimuli is not visible or audible to the user, and it is not possible to entering an answer during this time interval. During this short delay the user keeps the task information about the stimuli in his working memory. To make the difficulty level of the task higher the computer may present a visual or auditory disturbance during the delay. For the visuo-spatial working memory task, this can be done by presenting task-irrelevant visual stimuli during the delay. In verbal tasks, task-irrelevant sounds may be presented. In this case the user must concentrate even harder to keep the presented task information in his working memory.

After the delay, the user has to answer to the presented task in accordance with what he has kept in working memory during the delay. The answer is suitably performed by input of data into the computer e.g. by means of entering the answer into the screen 106, by typing on the key-pad 102, clicking with the computer mouse 104 or simply telling the answer into the microphone 103 if the computer is voice managed.

The computer 110 then evaluates whether the answer is correct or not and then presents a subsequent task in accordance with predetermined adaptation rules and based on said evaluation having a difficulty level. In this way the difficulty level of the tasks can be adapted close to the capacity of the user and keep the user to be motivated to keep on with subsequent tasks. The user is motivated if the tasks are neither too difficult nor too simple, i.e. if he not gets bored.

The predetermined adaptation rules may preferably mean that a subsequent task of a higher difficulty level in the program is presented, if one or more, preferably three, preceding tasks of the current level has been solved by the user. If the task of the current difficulty level has been answered incorrectly by the user, a subsequent task of a lower level will be presented. In such a way, the training can be performed close to the capacity of the patient, since the adaptive training adjusts the difficulty on a trial-by-trial basis.

Suitably, the adaptive training comprises a degree of difficulty, which is adapted in such a way that the patient will solve the tasks at a degree of correctness of preferably 70–90% averaged over each task and each day. Most preferably, the adaptive training comprises a degree of difficulty, which is adapted in such a way, that the patient will solve the problems at essentially 80%. When the tasks are not adaptive to the capacity of the user, and the working memory load is low, the training has no effect on the capacity of the working memory, which was studied in a placebo group (see later on).

The working memory comprises spatial, verbal and object-orienting parts, involving both retention of information in working memory, as well as both retention and manipulation (e.g. sorting) of information. Training of any one of these parts will improve the working memory capacity of the user and thus also the influence upon the basal ganglia via the stratio-frontal loops, but training all three parts of the working memory of the user, by means of so called sub-tasks or partial training tests, improves the working memory capacity in a more efficient way.

Training the Spatial Part of the Working Memory.

Figure 2:
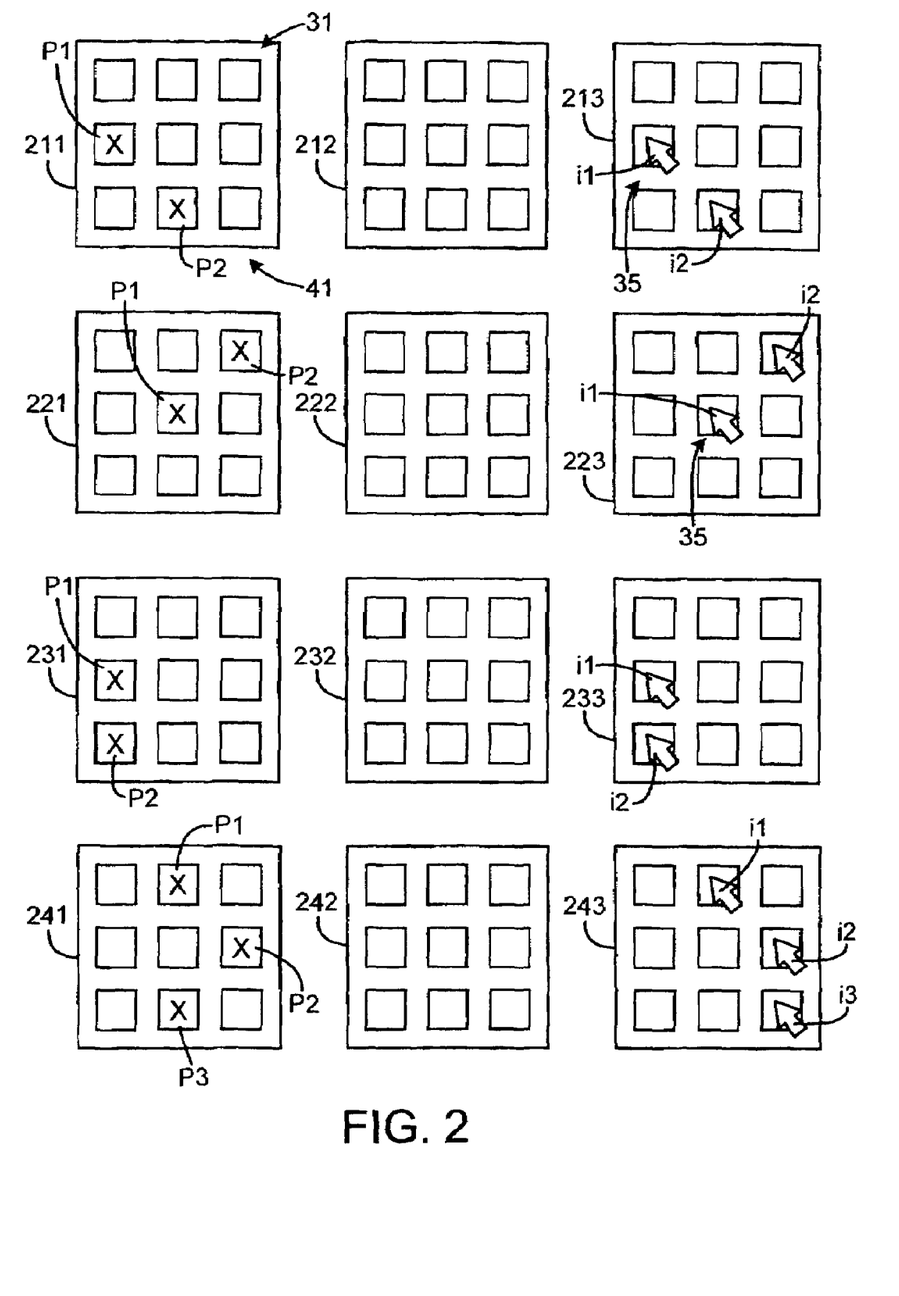
FIG. 2 shows a visuo-spatial working memory task according to the present invention.

The spatial part of the working memory may be trained by the visuo-spatial working memory task provided by the computer program run on the computer 110. This task is shown in FIG. 2 as four sets of presentation sequences that are visible to the user on the screen 106. The task is performed in the following steps:

211. A first task of a first difficulty level is presented, wherein lightened squares P1, P2 appear one at a time in a three by three grid 41. Advantageously, the grid may also, constitute a four by four grid, but for the sake of clarity just nine squares are shown.
212. A delay of e.g. 5 seconds appears 212.
213. Then the user may indicate the positions of the earlier lightened, but now turned of, squares i1, i2 in the same order as they were lightened 213 by means of the computer mouse 104 acting on a pointer 35. This will provide the input of data into the computer 110 corresponding to the user's answer regarding the first task of the first level. The computer 110 evaluates the input data to establish if the answer is correct or not.

The user makes several similar tasks of the same difficulty level, see steps 221, 222, 223, 231, 232, 233.

241. If the user makes e.g. three trials running correctly, a task with a higher difficulty level will be presented by the computer 110 on the screen 106. Thus lightened squares PI, P2, P3 appear one at a time.
242. A delay of e.g. 1 second is performed.
243. The user then marks his answer If the user misses the correct square P3 and make an input i3 at a non-correct position 243, a task with a lower difficulty level will be presented, that is the same as the previously done 211, 221 and 231. This is achieved by the computer program according to the present invention, which compares the user's answer, i.e. the input data, with the correct data according to a flow chart shown in FIG. 5.

Training the Verbal Part of the Working Memory.

Figure 3:
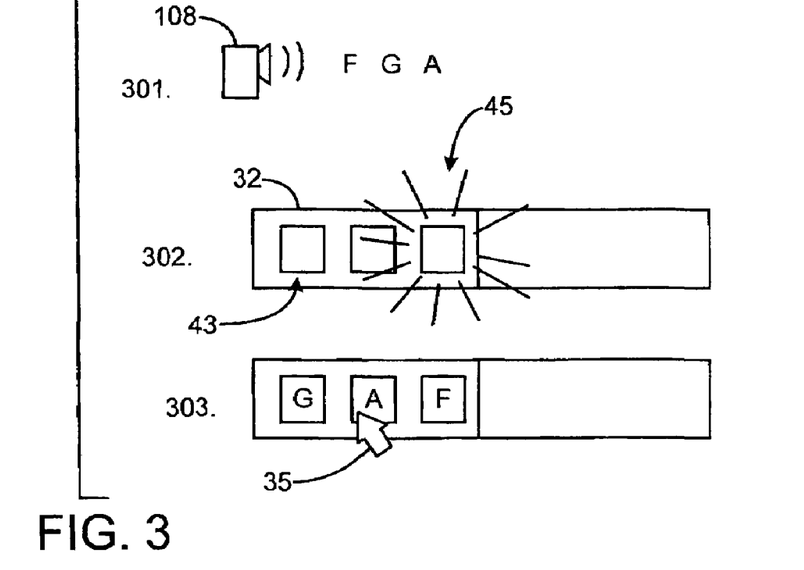
FIG. 3 shows a letter-span task according to the present invention.

The verbal part of the working memory is trained e.g. in the letter-span task provided by the computer program run on the computer 110 and shown in FIG. 3.

The task is performed in the following steps:

301. Letters F, G, A are read aloud by the loud speaker 108 one at a time. The user should remember the identity and the order of the letters.
302. A row of lamps 43, is then visible 302 on the screen 106 and a flashing lamp 45 cue the user as to which letter that should be reported back, e.g. if lamp no 3 was lit, the user should report the third letter that he previously heard.
303. The letters appear 303 on the screen 106, but in a different order than previously presented, whereby the patient 3 may mark the correct letter by means of the pointer 35, which constitutes the input data to the computer 110. The computer evaluates the input data to establish if the answer was correct or not.

Training the Object Orienting Part of the Working Memory.

Figure 4:
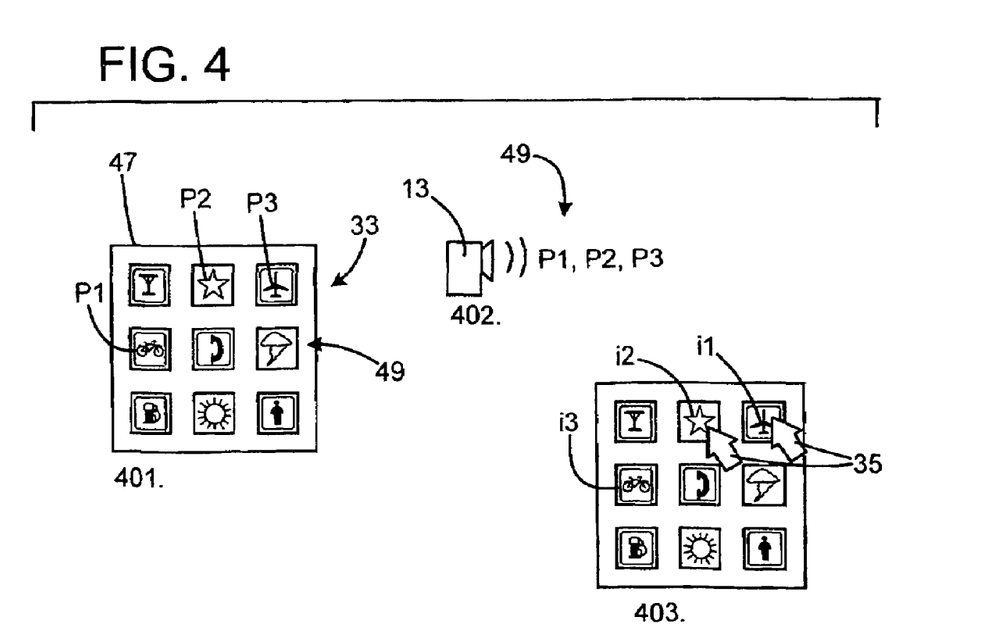
FIG. 4 shows a backwards verbal/or object span task according to the present invention.

The object oriented part of the working memory is trained e.g. in the backwards verbal/or object span task with manipulation of the information kept in working memory which is shown in FIG. 4.

The task is performed in the following steps

401 A keyboard with 9 different objects (which may be digits) are shown to the user on the screen 106 and 402 a series of said shown objects are read aloud via the loud speaker 108 e.g. the three objects. E. g. the loud speaker speaks out "bicycle" P1, "star" P2, "airplane" P3.

403 After the series of objects is heard, the user shall mark the objects, but in the reverse order, by means of the computer mouse 104 or the keypad 102, and thus making an input to the computer 110 by means of the pointer 35. The correct answer is "airplane" i1, "star" i2 and "bicycle" i3.

Of course, the content of the sub-tests may comprise other symbols or signs as well, in order to achieve the results of stimulating the working memory according to the present invention.

Also, according to the shown problem set of complexity in FIGS. 2 and 3, when the user makes three trials running correct, he will be presented a higher level comprising further training exercises. The next level will comprise an additional object, which will be read aloud. A mistake will signal the program to present a lower difficulty level. Thus, an adaptive mechanism is provided for all the sub-tasks and training exercises For all the partial exercises for training the working memory, the difficulty is according to the invention adjusted by changing the number of stimuli that should be remembered. Preferably, after three correct trials running on one level, the level is raised to a higher level. After one mistake, the level is lowered. This ensures an overall accuracy of approximately 80%, which is a difficulty level that motivates the user. Suitably, the user may complete 30 trials on each partial exercise every day, wherein the daily training time in total is approximately 10–120 minutes. The training exercises are preferably performed at least 3 days a week. The training according to the invention is performed for about 2–7 weeks preferably 5 weeks. This amount of training is necessary in order to induce neural plasticity.

In addition to that the training in accordance to the present invention improves the working memory of the user, if the user is affected by ADHD, a reduction in hyperactivity is achieved.

The reduction in hyperactivity after training of the working memory demonstrates a causal relationship between cognitive function and motor behaviour. Tests show that the improvement on non-trained working memory and problem solving tasks, which requires activation of the prefrontal cortex, suggests that the prefrontal cortex is the site of the training effect. The fact that cognitive training could affect both cognitive symptoms and hyperactivity in ADHD makes the method according to the invention of interest for future clinical use.

Figure 5:
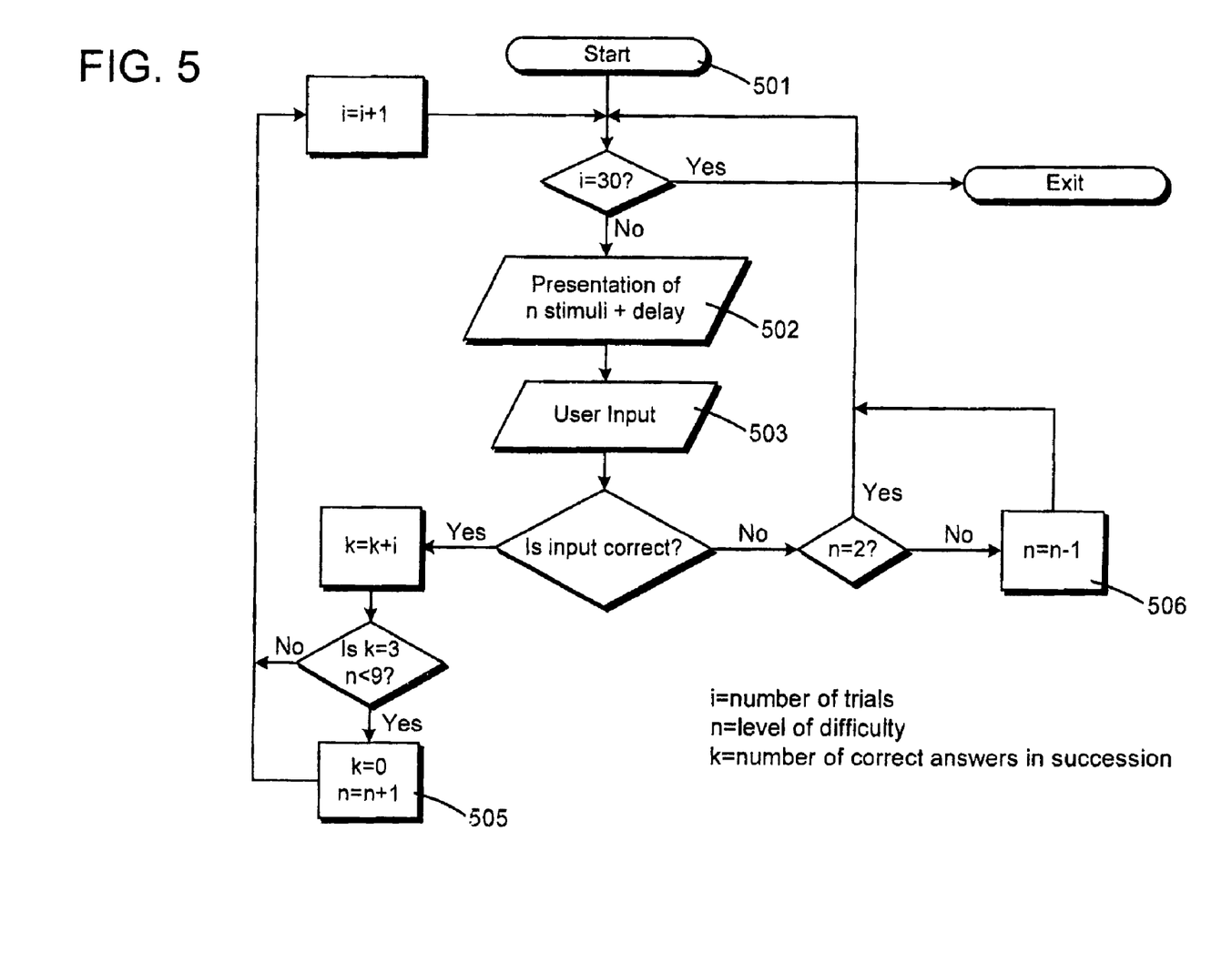
FIG. 5 is a flow chart illustrating an adaptive staircase adjusting the difficulty of a series of tasks according to the present invention.

FIG. 5 is a flow chart illustrating an adaptive staircase adjusting the difficulty of a series of tasks on a trial-by-trial basis according to the present invention. The series of tasks may be one of the three sub-task types described above. The three sub-tasks may all be free to be activated during one day training. That is the flow chart shown in predetermined FIG. 5 is actual for each sub-test. The adaptive mechanism is thus adopted for the verbal training exercise of the verbal working memory, the visuo-spatial training exercise of the visuo-spatial working memory and the object oriented training exercise of the object oriented working memory respectively.

A working memory training computer program in accordance with the present invention causes the computer 110 to provide the working memory training of the user. Said computer program comprises a readable medium, which when it is run on the computer 110, causes the computer to:

501 start the program and then 502 present a task at a first level n=2 comprising the task information. The task is designed for enhancing the working memory capacity of the user as described above. The first task will constitute the first trial i=1.

503 The computer receives the answer of the user in the form of input data.

504 A processing is performed by the computer 110, wherein the input data is evaluated whether the answer is correct or not.

505 Hereinafter the difficulty level of subsequent presented tasks will be based on said evaluation in accordance with predetermined adaptation rules such that the difficulty level of the subsequent task is adapted to the capacity of the user. In this example the adaptation rules determines that if the answer is correct three times running on one level, the level is raised to a higher difficulty level of the subsequent task. The parameter k will represent the number of correct answers in a series and the parameter n will represent the actual difficulty level of the task.

506 If the answer is not correct, that is when the user has not solved the task of the current level, the computer 110 will present a task of a lower difficulty level.

The first level to be solved will constitute level n=2, which therefore is the lowest level.

507 After e.g. 30 trials, the user has been training for a certain time. The training may be performed without any break or in parts. When i=e.g. 30, or alternatively after a certain time, the program causes the computer 110 to end the computer program and an exit will be provided.

The invention is implemented by means of a computer program product comprising the software code means for performing the training of the working memory of the user. The computer program product is run on the computer 110, within the computer training system 100. The computer program is loaded directly or from a computer usable medium, such as a floppy disc, a CD, the Internet etc.

Regarding the human brain, the so-called striato-frontal loops are associated with the basal ganglia and the prefrontal cortex. Those striato-frontal loops have an anomalous and not working interaction with the basal ganglia and the prefrontal cortex in the case of ADHD.

In traumatic brain injury, there could be damage to the basal ganglia, to the prefrontal cortex or to the white matter tracts that connect the basal ganglia and the prefrontal cortex.

The frontal lobe in the brain of the elderly can be a degenerated.

By means of training the working memory, which depends on the functioning of the prefrontal cortex of the human brain, according to the present invention, the disturbance of the striato-frontal loops will be less.

The effect of the working memory on hyperactivity could be mediated via the influence of prefrontal cortex upon the basal ganglia and via an integrative role of the striato-frontal loops.

Using the Invention for Treatment of Children with ADHD

The computer program may appear to be a video game, but actually allows the patient to perform complex mental tasks that exercise their working memory. The program has been validated in a study where fourteen children with ADHD undertook training of a visuo-spatial working memory task, a visuo-spatial version of backwards digit-span working memory task, and a spatial-verbal working memory task. Visual and verbal feedback was implemented in the computer program to increase compliance during the training. As a control, the inventor also designed a placebo-program, which was similar to the treatment-program, but did not include the two key features: Thus difficulty level was not interactively adjusted, and daily training amounted to less than ten minutes per day. The study was designed as a double-blind study where children, parents, and the psychologist administrating pre- and post-training tests were blinded to which version of the computer program the children had practiced and to the difference in expected effect of the two versions.

Subjects performed a battery of cognitive tasks before and after training to evaluate working memory capacity and prefrontal functioning. Impulsivity and hyperactivity was also measured.

The children in the treatment group all improved to a level comparable with that of treatment with methylphenidate. Several of the children have spontaneously stopped medicating after the working memory training program, and continue to be without medication several months after treatment.

Figure 6:
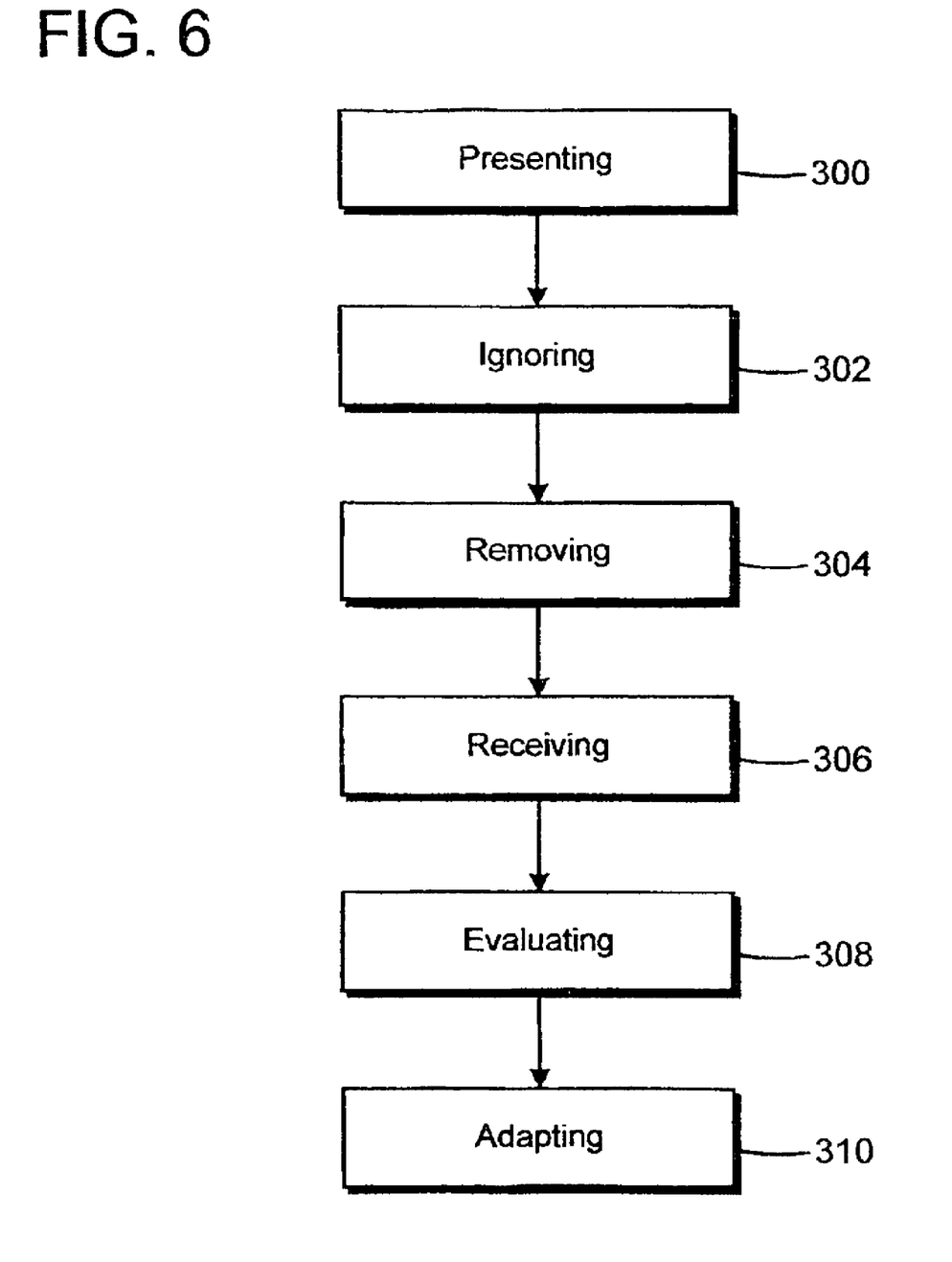
FIG. 6 is a schematic illustration of the method of the present invention.

With reference to FIGS. 1 and 6, the method of the present invention performs several steps. More particularly, the method iteratively performs the following steps until at least one of a predetermined time limit is exceeded and a predetermined number of tasks have been performed. In a presenting step 300, a task that has a difficultly level is presented to the user 107 (shown in FIG. 1). In an ignoring step 302, for a predetermined period of time, the computer ignores or blocks user answers. In a removing step 304, the computer removes at least one of visual and audible stimuli associated with the presented task such as the task 206. In a receiving step 306, an answer is received from the user 107 by the computer 110 to the presented task. In an evaluating Step 308, the computer evaluates whether the answer is correct or incorrect. In an adapting step 310, the computer adapts the difficulty level of a subsequent task to be presented in accordance with predetermined adapting rules 210 and the evaluation of the evaluation device 204. This is done so that the difficulty level of the subsequent task approached the memory capacity of the user 107.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A computer training system for improving the working memory capacity of a user who is using a computer within said system, the system comprising:
    a computer having means for presenting to said user via a presentation means a first task of a first difficulty level to a user;
    means for providing a delay of a predetermined period of time, and during said delay time said computer ignoring user answers and removing at least one of visual and audible stimuli associated with the presented task;
    means for receiving, via an input means, a user answer to a presented task;
    means for evaluating whether the answer is correct or incorrect;
    means for adapting the difficulty level a subsequent task to be presented, in accordance with predetermined adaptation rules and said evaluation; and
    means for presenting subsequent tasks until at least one of a predetermined time limited is exceeded and a predetermined number of tasks have been performed, such that the difficulty level of the subsequent task approaches a memory capacity of the user.

2. The computer training system according to claim 1, wherein said predetermined adaptation rules determine that after at least one correct answer the difficulty level is raised and after at least one incorrect answer the difficulty level is lowered.

3. The computer training system according to claim 2, wherein said difficulty level is raised after three correct answers and wherein the difficulty level is lowered after one incorrect answer.

4. The computer training system according to claim 1, wherein the computer is connectable to a server adapted for storing results of the tasks.

5. The computer training system according to claim 4, wherein the computer comprises a network interface for connecting to the server via a network.

6. The computer training system claim 4, wherein said server is accessible via a second computer.

7. The computer training system according to claim 1, wherein the computer is connectable to a server adapted for storing the working memory training computer program to enable a user to download the working memory training computer program to the computer.

8. A computer program product directly loadable into a computer in a computer training system, for improving the working memory capacity of a user the computer program product comprises software for performing the steps of:
    executing the computer program product;
    presenting a first task of a first difficulty level to a user via a presentation means;
    providing a delay of a predetermined period of time, and during said delay time ignoring user answers and removing at least one of visual and audible stimuli associated with the presented task;
    receiving an answer to said presented task via an input means;
    evaluating whether said answer is correct or incorrect;
    adapting the difficulty level of a subsequent task to be presented, in accordance with predetermined adaptation rules and said evaluation; and
    presenting subsequent tasks in accordance with the steps above until at least one of a predetermined time limit is exceeded and a predetermined number of tasks have been performed, such that the difficulty level of the subsequent task approaches a memory capacity of the user.

9. The computer program product according to claim 8, wherein said predetermined adaptation rules determine that after at least one correct answer the computer program product performs the step of:
    raising the difficulty level;
    and wherein said predetermined adaptation rules determine that after one or more incorrect answers the computer program product performs the step of:
    lowering the difficulty level.

10. The computer program product according to claim 9, wherein said difficulty level is raised after three correct answers and wherein the difficulty level is lowered after one incorrect answer.

11. The computer program product according to claim 8, wherein the degree of difficulty of subsequent tasks is adapted in such a way that the user will tend to solve the tasks at a degree of correctness of 70–90%.

12. The computer program product according to claim 11, wherein, said degree of correctness is 80%.

13. The computer program product according to claim 8, further performing the step of: storing the results of a task in a server connected to the computer.

14. The computer program product according to claim 8, wherein the computer program product is downloaded from a server.

15. The computer program product according to claim 8, wherein the predetermined delay time is 0.1 to 10 seconds.

16. The computer program product according to claim 8, performing the step of:
presenting a visual or auditory disturbance during said delay.

17. The computer program product according claim 8, wherein the tasks are adapted for training the spatial part of the working memory of the user.

18. The computer program product according to claim 8, wherein the tasks are adapted for training the verbal part of the working memory of the user.

19. The computer program product according to claim 8, wherein the tasks are adapted for training the object orienting part of the working memory of the user.

20. The computer program product according to claim 8, wherein the computer program product is used for therapeutic treatment of a person with Attention Deficit Hyperactivity Disorder (ADHD).

21. The computer program product according to claim 20, wherein the therapeutic treatment is used for reducing the hyperactivity of the person with ADHD.

22. The computer program product according to claim 8, wherein the computer program product is used for therapeutic treatment of a person with traumatic brain injury.

23. The computer program product accorcing to claim 8, wherein the computer program product is used for therapeutic treatment of an old person with impaired capacity of the working memory.

24. The computer program product according to claim 8, wherein the computer program product is remotely accessed from a second computer via a server and a network.

25. The computer program product according to claim 8 wherein the computer program product is presented to the user as a game.

26. A computer usable medium, comprising software instructions which, when executed by a computer, perform the steps of:
using software instructions of a computer usable medium to activate a computer;
presenting a first task of a first difficulty level to a user via a presentation means;
providing a delay of a predetermined period of time, and during said delay time ignoring user answers and removing at least one of visual and audible stimuli associated with the presented task;
receiving an answer from a user to said presented task via an input means;
evaluating whether said answer is correct or incorrect;
adapting the difficulty level of a subsequent task to be presented, in accordance with predetermined adaptation rules and said evaluation; and
presenting subsequent tasks in accordance with the steps above until at least one of a predetermined time limit is exceeded and a predetermined number of tasks have been performed, such that the difficulty level of the subsequent task approaches a memory capacity of the user.

27. The computer usable medium according to claim 26, wherein said predetermined adaptation rules determine that after one or more correct answers the computer usable medium performs the step of: raising the difficulty level; and wherein said predetermined adaptation rules determines that after one or more incorrect answers the computer program product performs the step of: lowering the difficulty level.

28. The computer usable medium according to claim 27, wherein said difficulty level is raised after three correct answers and wherein the difficulty level is lowered after one incorrect answer.

29. A method for improving a working memory of a user, comprising:
iteracively performing the following steps until at least one of a predetermined time limit is exceeded and a predetermined number of tasks have been performed;
presenting a task having a difficulty level to a user;
for a predetermined period of time, ignoring user answers and removing at least one of visual and audible stimuli associated with the presented task; receiving an answer to the presented task from the user;
evaluating whether the answer is correct; and
adapting the difficulty level of a subsequent task to be
presented in accordance with predetermined adaption rules and said evaluation such that the difficulty level of the subseguent task approaches a memory capacity of the user.

* * * * *